United States Patent [19]

Göldner

[11] Patent Number: 4,541,669
[45] Date of Patent: Sep. 17, 1985

[54] VEHICLE SEAT HAVING AN ADJUSTABLE THIGH SUPPORTS

[75] Inventor: Walther Göldner, Denkendorf, Fed. Rep. of Germany

[73] Assignee: Keiper Recaro GmbH & Co., Fed. Rep. of Germany

[21] Appl. No.: 513,320

[22] Filed: Jul. 13, 1983

[30] Foreign Application Priority Data

Jul. 13, 1982 [DE] Fed. Rep. of Germany ....... 3226101

[51] Int. Cl.⁴ .............................................. A47C 7/50
[52] U.S. Cl. ................................. 297/284; 297/429
[58] Field of Search ....................... 297/284, 408, 429

[56] References Cited

U.S. PATENT DOCUMENTS

| | | | |
|---|---|---|---|
| 3,429,615 | 2/1969 | Belk | 297/408 |
| 4,099,779 | 7/1978 | Goldner | 297/408 |
| 4,165,126 | 8/1979 | Strien et al. | 297/284 |
| 4,256,341 | 3/1981 | Goldner et al. | 297/408 |
| 4,324,431 | 4/1982 | Murphy et al. | 297/284 |
| 4,334,709 | 6/1982 | Akiyama et al. | 297/284 |

FOREIGN PATENT DOCUMENTS

| | | | |
|---|---|---|---|
| 1099866 | 2/1961 | Fed. Rep. of Germany . | |
| 1945571 | 3/1971 | Fed. Rep. of Germany | 297/408 |
| 2019141 | 11/1971 | Fed. Rep. of Germany | 297/284 |
| 1537551 | 12/1978 | United Kingdom | 297/408 |

Primary Examiner—Francis K. Zugel
Attorney, Agent, or Firm—Wigman & Cohen

[57] ABSTRACT

A one- or two-piece upholstery support (5) of a thigh support of a vehicle seat is pivotably arranged on a support device (11) which, in turn, is mounted on longitudinally running supports (7) so as to be longitudinally movable. These supports (7) extend forward from the rear section (2) of the seat portion. In this preferred arrangement, a detent mechanism (37, 23), which releasably secures the upholstery support (5) against pivoting, is provided between the upholstery support (5) and the support device (11). The support device (11) includes a releasable locking device (25–27), in order to secure the support device (11) in the desired position on the supports (7) against longitudinal movement.

20 Claims, 6 Drawing Figures

VEHICLE SEAT HAVING AN ADJUSTABLE THIGH SUPPORTS

BACKGROUND OF THE INVENTION

1. Field of the Invention

The invention relates to a vehicle seat having a thigh support which can be adjusted both in the longitudinal direction of the seat and about an axis running in the lateral direction of the seat and can be locked in selectable positions relative to the rear section of the seat portion which carries a back rest. The upholstery of this thigh support lies on an upholstery support which is borne by at least one support which projects forward from the frame of the rear section of the seat portion.

2. Description of the Prior Art

A vehicle seat of this type is already known, for example, see West German Pat. No. 1,099,866. In the known seat, the support of the thigh support is formed so as to be capable of being extended in the longitudinal direction. The rear end of the support is pivotably mounted on the adjacent seat portion by means of an adjusting and locking hinge and supports a rear upholstery element. At its forward end, the support includes a second, forward upholstery element whose distance from the rear upholstery element increases when the support is extended in the longitudinal direction. An upholstery covering, which extends from the rear upholstery element to the forward upholstery element, must therefore be made so as to be extensible. In the known vehicle seat, this circumstance is dealt with in that the forward end of the covering is wrapped downwardly around the front upholstery element and is held tight by tension springs provided on the underside of the thigh supports. The disadvantage thereof is that, as the amount of extension increases, the resulting higher tension in the springs increasingly compresses the upholstery elements supporting the covering and the upholstery elements thereby become harder. The size of the usable adjustment range in the longitudinal direction is therefore insufficient. Because of the large distance between the front and rear upholstery elements of the thigh supports, in the known seat it often occurs that the covering between the two upholstery elements is pressed down, even when strong springs are used to hold the upholstery covering tight, i.e. the support of the upper thighs of the seat user is not accomplished over a large area, but essentially only in the area of the front upholstery element. The thigh supports therefore cannot contribute to the desired degree towards improving the comfort of the seat. The use of stronger springs to tighten the covering also presents the danger of tearing the covering. In addition, assembling the thigh supports is difficult and time-consuming.

SUMMARY AND OBJECTS OF THE INVENTION

The object of the invention is to create a vehicle seat of the type being discussed, in which a greater adjustment range for the thigh supports is available as compared with the known seat and a high degree of seat comfort for the user is assured.

In a vehicle seat of the above-described type, this object is achieved according to the invention in that at least two supports are provided which are rigidly connected with the frame of the rear section of the seat portion and lie adjacent to each other with a space therebetween and are parallel to each other and on which a support device is arranged so as to be longitudinally movable and capable of being locked in selectable positions. On the support device, the upholstery support of the thigh supports is mounted in such a manner as to be pivotable about the axis running in the lateral direction. The upholstery support can be locked in the selectable pivot positions by means of a detent mechanism provided on the upholstery support and on the support device. The detent mechanism includes detent elements. By means of the fact that according to the invention the upholstery support is mounted on a longitudinally movable support device, the thigh support can be shifted longitudinally as a unit independently of the rear section of the seat portion on which the supports are located, i.e. there are no restrictions of any kind on the longitudinal adjustment of the thigh supports. In the same manner, the pivoting movement of the upholstery support can take place without hindrance and independently of the rear section of the seat portion. During adjustment the upholstery support is moved as a unit relative to the support device and/or is moved with the support device on the supports relative to the rear seat portion, in contrast to the above-mentioned known vehicle seat, there is no change in the characteristics of the upholstery due to an adjustment of the upholstery support, so that the greatest possible degree of seat comfort can be achieved with any desired adjustment of the thigh supports.

In a preferred exemplary embodiment, the upholstery support consists of two adjacent upholstery supports, which are pivotably mounted on the support device independently of each other and each supports an upholstery element separate from the upholstery of the other upholstery support body. In this embodiment, the detent mechanism includes at least two detent devices, of which at least one is associated with each of the two upholstery support bodies. In this two-element embodiment of the thigh supports, which advantageously also make possible an independent longitudinal movement of both thigh supports, an individual adaptation for each of the two upper thighs is possible, so that an optimal support is achieved.

In a further advantageous exemplary embodiment, it is provided that, in order to provide a pivotable mounting of the upholstery support of the thigh supports on the support device, the pivot axis is mounted in one of these two elements and the other element includes longitudinal holes which receive the pivot axis in such a manner as to allow it to rotate and move laterally to its longitudinal axis. This embodiment further provides that the longitudinal holes extend in the direction in which the upholstery support of the thigh supports is moved relative to the support device to open and close the detent mechanism containing the interengaging detent elements. This exemplary embodiment also provides the additional advantage of very simple operation because, when the user takes hold of the upholstery support to pivot the thigh supports, he can both activate the detent mechanism and also effect the inclination adjustment of the thigh supports by moving the upholstery support.

Preferably, the arrangement is designed such that the longitudinal holes extend in the longitudinal direction of the seat or at an acute angle to that direction and the upholstery support of the thigh support can be moved away from the rear section of the seat portion in the direction of the longitudinal holes against the force of a pre-biased return spring to release the detent mechanism. In this exemplary embodiment, the ease of operation is even further increased because the user can both activate the detent mechanism for the pivot mount and effect a longitudinal movement of the upholstery support by taking a single action, namely by moving the upholstery support in the longitudinal direction of the seat.

BRIEF DESCRIPTION OF THE DRAWINGS

The invention is described in greater detail below with the aid of the exemplary embodiments illustrated in the drawings.

DETAILED DESCRIPTION OF THE PREFERRED EMBODIMENTS

Figure 1:
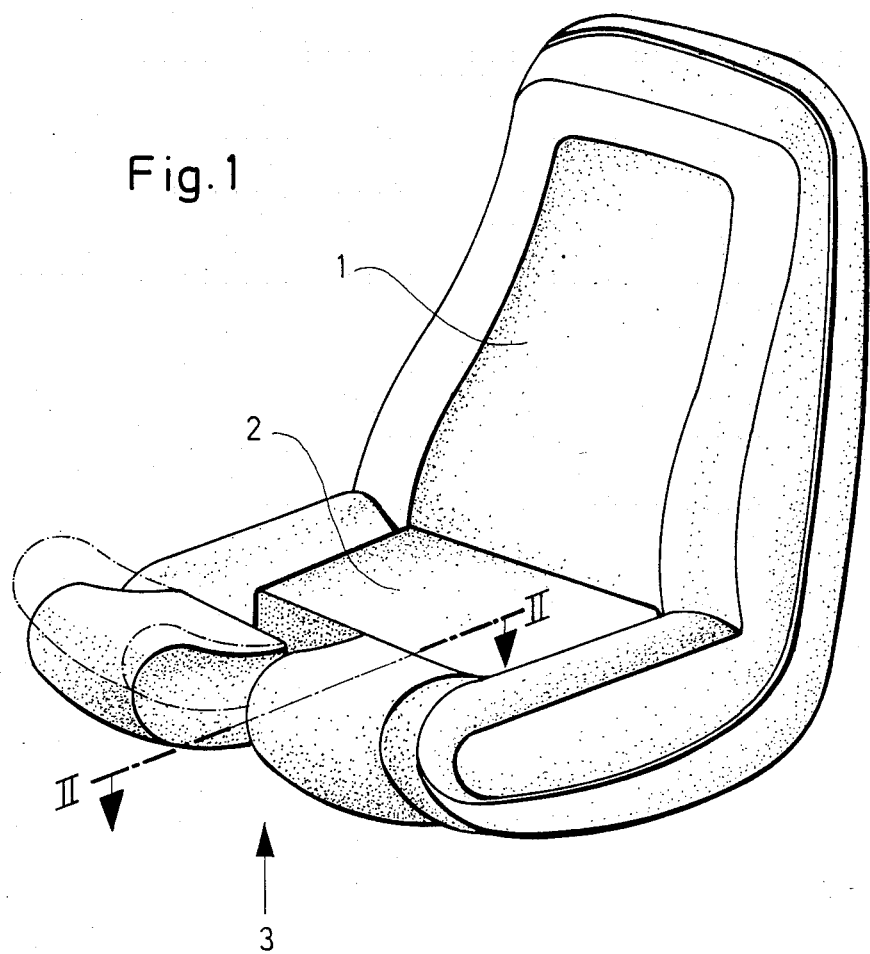
FIG. 1 is a perspective view of an exemplary embodiment of the vehicle seat having a thigh support formed in two parts.

FIG. 1 shows a vehicle seat, the seat portion of which includes a rear section 2 adjacent the back rest 1 and a thigh support 3 extending forward from this rear section 2. The thigh support 3 has a two-piece upholstery support, whereby the two identically formed elements can be both moved longitudinally and adjusted with respect to their inclination and these movements can take place independently of each other and of the rear section 2 of the seat portion. Both elements of the two-piece upholstered thigh support 3 are formed identically and are connected in the same manner with the rear section 2 of the seat portion, so that the following detailed description based on FIGS. 2 through 5 refers to the construction and arrangement of only one of the two elements of the upholstered thigh support 3.

Figure 4:
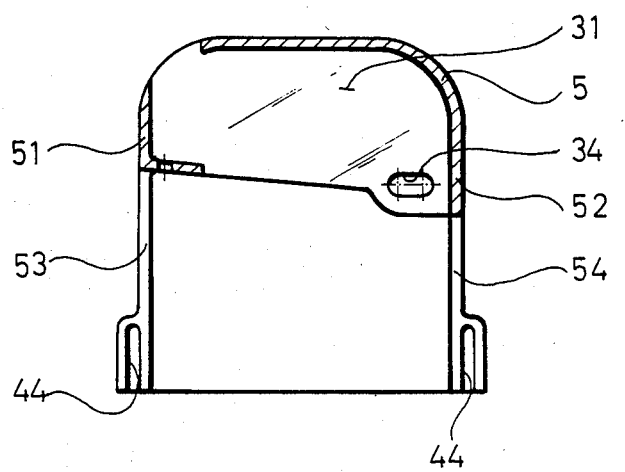
FIG. 4 is a longitudinal section of an upholstery support body of the thigh support of the exemplary embodiment, shown in a smaller scale than FIGS. 2 and 3, whereby the section is taken along the line IV—IV in FIG. 3.

Each of the two elements of the upholstered thigh support 3 has as a primary component an upholstery support body 5 formed from a single piece of plastic, which is shown in detail in longitudinal section in FIG. 4. The upholstery support body 5 basically has the shape of a basin or tub with rounded corners and a downwardly directed opening, whereby the upper outside surface of the basin floor and the adjoining areas of the side surfaces are provided as contact surfaces for a fitted upholstery element 6 made of a foam material. Before additional details of the form of the upholstery support body 5 are described, the following first describes the design of the support device provided as a mount for the upholstery support body 5.

Figure 2:
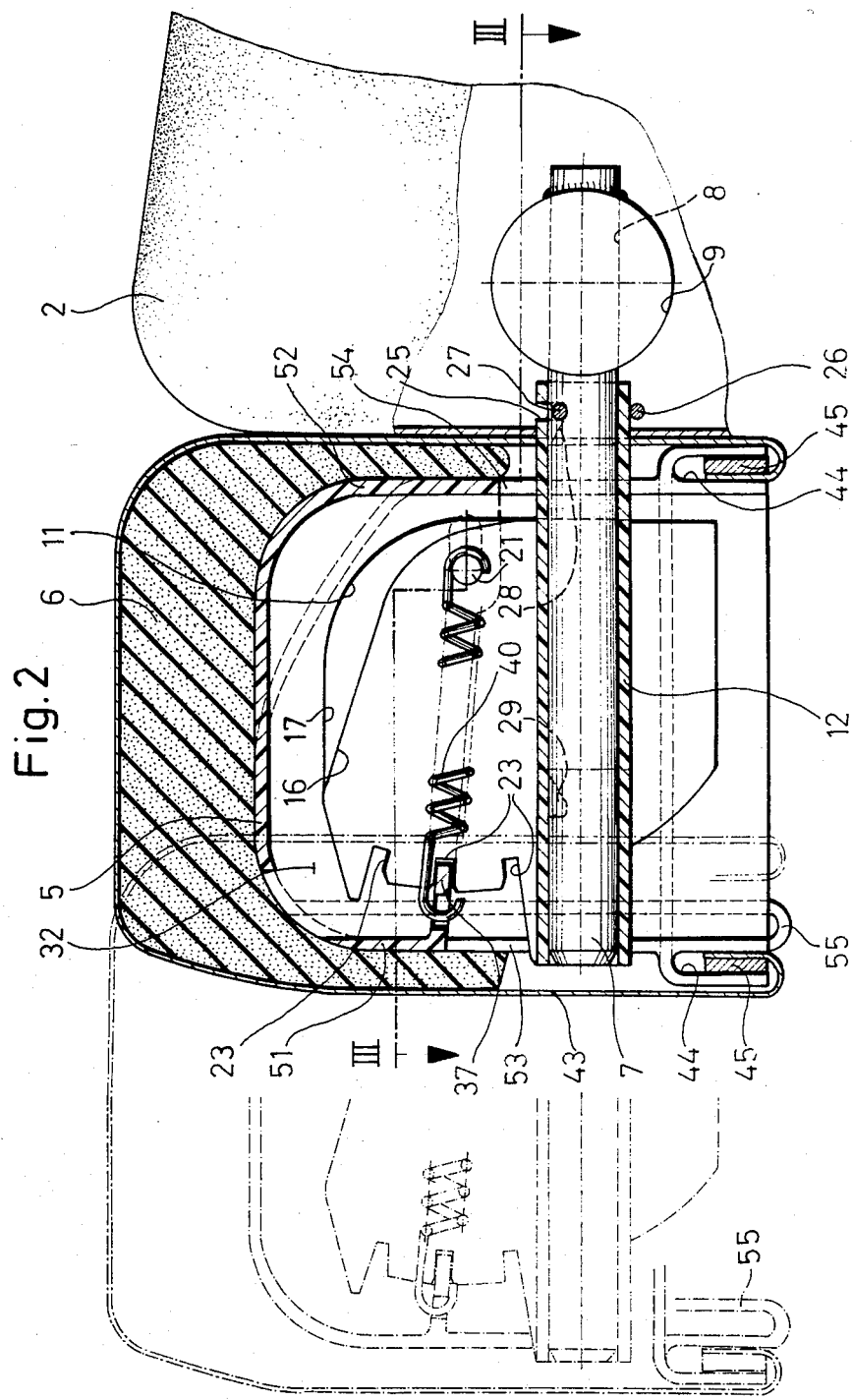
FIG. 2 is an enlarged section along the line II—II in FIG. 1.
Figure 3:
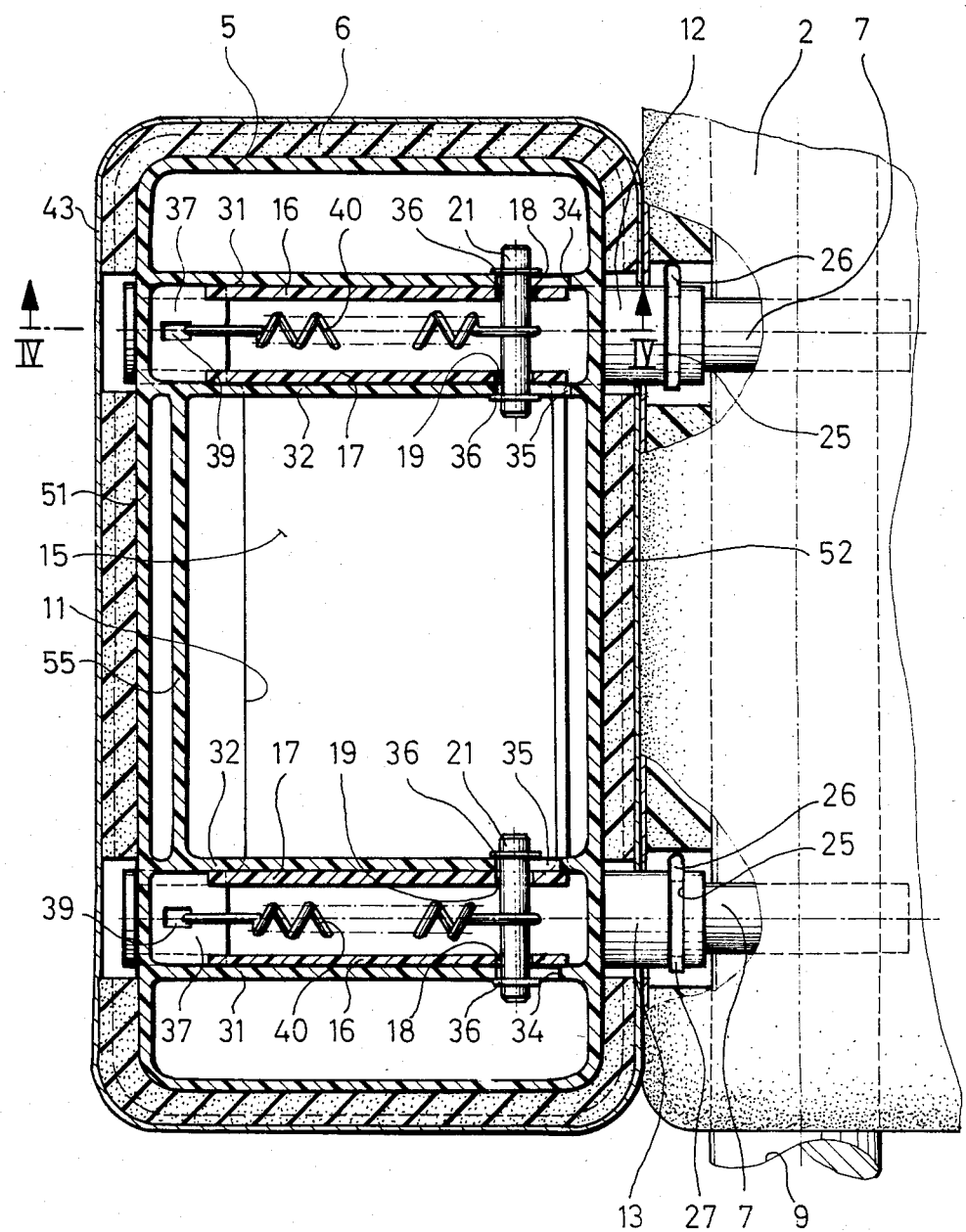
FIG. 3 is a section along the line III—III in FIG. 2.

As shown in FIGS. 2 and 3, this support device is connected with the frame of the rear section 2 of the seat portion by means of supports, which in the present exemplary embodiment are each formed by two spaced, parallel bars 7 running in the longitudinal direction of the seat, the rear end sections 8 of which are rigidly connected by welding or force-pressing with a cross member 9 arranged at the front end of the rear section 2 of the seat portion, and of which the two parallel bars 7 are associated with each of the two upholstery support bodies 5. The support device includes a guide body 11 for each upholstery support body 5, which guide bodies 11 are slidably mounted on the two associated bars 7 and are made from a single piece of plastic, as shown in detail in the side view in FIG. 5. As seen in FIG. 3, the guide body 11 has on each side guide sleeves 12 and 13 which extend completely therethrough and by means of which the guide body 11 is mounted on the bars 7 in a longitudinally slidable manner. The guide sleeves 12 and 13 are connected with each other by a plate 15. An outer rib 16 and an inner rib 17 extend along each of the guide sleeves 12 and 13. These ribs 16 and 17 extend in the longitudinal direction of the seat parallel to each other at a distance from each other and define planes running perpendicular to the plane connecting the axes of the guide sleeves 12 and 13. In the back portion of each pair of ribs 16 and 17, bores 18 and 19 are provided in alignment with each other, so that a full-length opening is created for each mounting bolt 21 on each pair of ribs 16 and 17. These mounting bolts 21 are provided to form a pivot mount for the upholstery support 5 on the guide body 11. On their forward edge areas opposite the bores 18 and 19 shown in FIG. 2, the ribs 16 and 17 include cut-outs 23 which form aligned detent notches that are part of a detent mechanism. This detent mechanism makes it possible to detachably fix the upholstery support body 5, which is pivotably mounted on the guide body 11 by means of the mounting bolts 21, in selected pivot positions, which are described in greater detail below.

The rear end areas of the guide sleeves 12 and 13 have slot-like openings 25, through which a detent spring 26 located on each of the respective guide sleeves 12 and 13 presses with one of its shanks 27 against the associated bar 7. The bar 7 is provided with detent notches 28 and 29 formed in the upper surface area facing the slot-like opening 25, in which detent notches 28 and 29 the shank 27 of the detent spring 26 can engage. One of the lateral limit surfaces of the detent notches 28 and 29 forms an inclined plane so that, with a sufficiently high force acting in the longitudinal direction, the shanks 27 of the detent springs 26 can disengage from the detent notches 28 or 29 against their spring force by running along the ramp surface, thereby releasing the detent engagement. Thus, the detent spring 26, the shank 27, and the detent notches 28 and 29 together form a releasable holding or locking device.

As shown in FIG. 3, the upholstery support body 5 has respective rib pairs with ribs 31 and 32 which are parallel to each other and to the ribs 16 and 17 for the cooperation with the ribs 16 and 17 or with each rib pair of the guide body 11. These ribs 31 and 32 have inner surfaces which face each other and are guided on the outer surfaces of the ribs 16 and 17 in a sliding manner. In their rear areas, which are aligned with the bores 18 and 19 in the ribs 16 and 17 in the assembled condition best illustrated in FIG. 3, the ribs 31 and 32 of the upholstery support body 5 include longitudinal holes 34 and 35, which align with each other, extend in the longitudinal direction defined by the longitudinal axis of the guide sleeves 12 and 13, and are penetrated by the mounting bolts 21. Lock washers 36, which abut the outside of the ribs 31 and 32, secure the mounting bolts 21 against axial movement.

In their forward end areas opposite the longitudinal holes 34 and 35, each pair of ribs 31 and 32 is connected by a detent plate 37, which forms part of the detent mechanism for the pivot movement of the upholstery support body 5 on the guide body 11 and in the closed position of the detent mechanism best shown in FIG. 2, this detent plate 37 engages in the cutouts 23 which serve as detent notches in the ribs 16 and 17 of the guide body 11. As shown in FIG. 3, each of the detent plates 37 includes an opening 39, in which one end of a draw spring 40 engages, the other end of which is anchored on the associated mounting bolt 21. These draw springs 40 act as pre-biased return springs, which hold the upholstery support body 5 forcibly in the position relative to the guide body 11 corresponding to the closed position of the detent mechanism. As best shown in FIG. 2, in this position, the edges of the detent plates 37 facing the cut-outs 23 are in detenting engagement therewith. Also, as shown in this position in FIG. 3, the forward edges, relative to the longitudinal direction of the seat, of the longitudinal holes 34 and 35 of the ribs 31 and 32 lie against the mounting bolts 21. If the upholstery support body 5 is moved forward against the force of the draw spring 40, so that the longitudinal holes 34 and 35 lie with their rear edges against the mounting bolts 21, then the detent plates 37 are lifted out of the cut-outs 23 of FIG. 2 and the detent mechanism is in its opened or released condition, so that the upholstery support body 5 can be pivoted relative to the guide body 11 about the pivot axis formed by the mounting bolts 21.

As can be seen in FIGS. 2 and 3, the upholstery element 6 of the upholstery support body 5 is provided with an outer covering 43 which is drawn over down to the lower edge of the upholstery support body 5. As seen in FIG. 2, the upholstery support body 5 has a downwardly open groove 44 along its lower edge, in which a stiffening strip 45 engages. This strip 45 is attached to the outer covering 43 along the end area thereof.

From FIGS. 2 and 4, it can be seen that the upholstery support body 5 includes recesses 53 and 54 in its side walls 51 and 52 running laterally to the longitudinal direction of the seat in the lower portion of the area between the ribs 31 and 32, through which recesses 53 and 54 as well as the guide sleeves 12 and 13 of the guide body 11 extend. In the area of these recesses 53 and 54, even the downwardly open groove 44 is interrupted. As shown in FIG. 2, in the area between the inner ribs 32 of the upholstery support body 5, a fillet 55 is formed on the back side of its downwardly open edge. This fillet 55 can be used as a handle for the seat user, in order to move the upholstery support body 5 to perform the longitudinal setting and/or to release the detent mechanism for the adjustment of the pivot position.

As mentioned above, the activation of the detent mechanism is accomplished by pulling the upholstery support body 5 relative to the guide body 11 forward against the force of the return draw springs 40, whereby the edge of the detent plates 37 disengage with the cut-outs 23 which serve as detent notches in the ribs 16 and 17 of the guide body 11. The upholstery support body 5 can then be pivoted into the desired pivot position about the pivot axis defined by the mounting bolts 21 and re-engaged in a detenting manner by engaging the detent plates 37 in the cut-outs 23 corresponding to this pivot position. Thus, the detent engagement, when the upholstery support body 5 has been released, is returned into detenting engagement by the force of the return draw springs 40. As shown in FIG. 3, when the seat user pulls on the fillet 55 with a force sufficient to overcome the force of the return draw springs 40, so that the rear edges of the longitudinal holes 34 and 35 rest against the mounting bolts 21 and the pulling force applied by the seat user is thus transferred form-fittingly from the upholstery support body 5 to the guide body 11, the shank 27 of the detent spring 26 disengages from the notch 28 shown in FIG. 2, so that a longitudinal shifting of the upholstery support body 5 on the bars 7 takes place.

An exemplary embodiment is illustrated in FIGS. 2 and 3, in which the upper side of the upholstery element 6 and the associated upholstery support body 5 are formed essentially smooth and horizontal. As a variation, the rear area of the upholstery 6 could be made thicker and the upholstery support body 5 could have a correspondingly shorter height in this area, as is illustrated in FIG. 2 by the broken double line.

Figure 6:
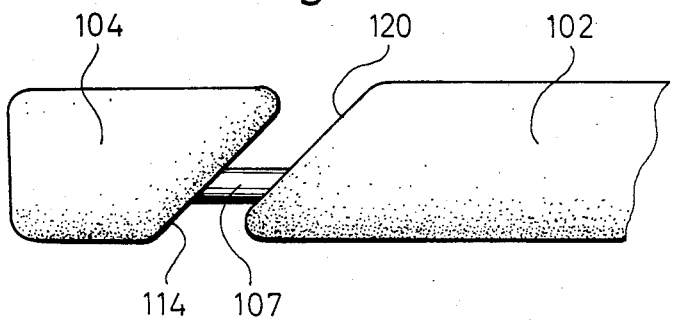
FIG. 6 is a simple, schematic break-away side view of a thigh support and the adjacent section of the seat portion of a second exemplary embodiment of the vehicle seat.

FIG. 6 shows a schematically simplified further exemplary embodiment, in which the end surface 114 of the thigh support 104 which faces the rear section 102 of the seat portion is rearwardly inclined in the same manner as the front end surface 120 of the rear section 102. When this is done, the steepness of the inclination of the end surfaces 114 and 120 is selected such that, even at the greatest possible distance of the thigh support 104 from the section 102, i.e., when the support device of the thigh support 104 on the bars 107 has reached its most extended forwardly-drawn position, the thigh support 104 and the rear section 102 of the seat portion overlap, so that, when viewed from above, the support surface appears optically uninterrupted. To form the inclined surface of the end surface 114, the upholstery of the thigh support 104 can be formed so as to extend rearwardly over the associated upholstery support, whereby the size of the overlap decreases from the top to the bottom.

In both of the exemplary embodiments described above, the detent mechanism between the upholstery support body 5 and the guide body 11 serving as the support device therefor is formed in such a manner that the projecting detent element, i.e., the detent plate 37 in the illustrated exemplary embodiments, is provided on the upholstery support body 5 and the recesses or depressions for the engagement of the projecting detent plate 37 are formed on the guide body 11 of the support device. As a variation thereof, the arrangement can also be such that a projecting detent element, for example in the form of a projecting pin, is arranged on the support device and that appropriate holes for the selective engagement of the pin are provided in the area of the front wall of the upholstery support body 5 directed toward the pins.

Figure 5:
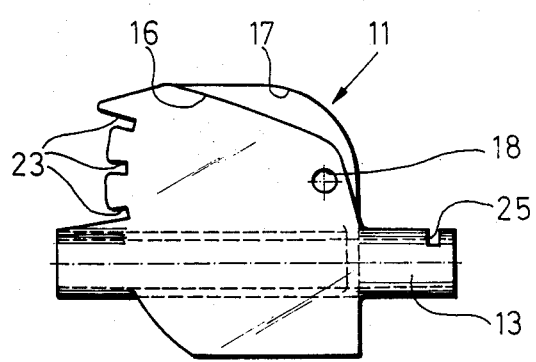
FIG. 5 is a side view, in the same scale as FIG. 4, of a guide body for the support device of the thigh support of the exemplary embodiment.

As shown in FIG. 3, the pivot axis about the mounting bolt 21 of the upholstery support body 5, which is defined by the bores 18 in the ribs 16 and 17 of the guide body 11 and which is arranged in the illustrated example of FIG. 5 above the guide sleeves 12 and 13 for the bars 7, could, as a variation to the described exemplary embodiment, also be arranged beneath the guide sleeves 12 and 13.

In addition, each of the guides formed by the parallel bars 7 and their associated guide sleeves 12 and 13 could be replaced by a rail pair comprised of two interengaging rails which can be formed similarly to the rails commonly used for longitudinal seat extension.

These embodiments of the present invention are considered illustrative only. Other modifications will be readily perceived by those persons skilled in the pertinent technology. Therefore, the scope of the invention is not limited by these embodiments but is covered by the spirit of the appended claims.

I claim:

1. A vehicle seat having a thigh support which can be adjusted both in the longitudinal direction of the seat and about an axis running in the lateral direction of the seat and can be locked in selectable pivot positions relative to a rear section of the seat which also has a back rest, further comprising:
    at least two bars rigidly connected with a frame of the rear section of the seat;
    a support device arranged on the two bars so as to be longitudinally movable and capable of being locked in selectable positions;
    an upholstery support body of the thigh support pivotably mounted on the support device;
    an upholstery element mounted on the upholstery support body; and
    a detent means, provided between the upholstery support body, and the support device for locking the upholstery support body in the selectable pivot positions;
    said upholstery support body being disposed as to encase the support device and detent means.

2. Vehicle seat according to claim 1, characterized in that:
    said thigh support includes two adjacent upholstery support bodies mounted each on a support device pivotably and independently of each other and each carrying a separate upholstery element; and
    said detent means includes two detent devices of which one detent device is associated with each of the two upholstery support bodies.

3. Vehicle seat according to claim 2, further comprising:
    each support device comprising adjacent guide bodies, each supported by the bars, on which guide bodies the upholstery support bodies are respectively mounted independently of each other in such a manner as to be pivotable about the axis running in the lateral direction; and
    a releasable locking means, mounted on the bars, for holding the guide bodies in the selected longitudinal positions on the bars.

4. Vehicle seat according to claim 1, characterized in that rear end sections of said bars are rigidly connected with a cross member arranged in an area of a front end of the rear section of the seat.

5. Vehicle seat according to claim 3, characterized in that:
    each of the bars includes a notch for each selectable longitudinal position and a shank of a detent spring, provided as a part of the releasable locking means, for engaging in a slotlike opening in a wall of a guide sleeve mounted on each of the bars.

6. Vehicle seat according to claim 1, characterized in that a pivotable mount for the thigh support is provided by a pivot axis through a mounting bolt arranged in longitudinal holes in the upholstery support body so as to allow the thigh support to rotate and slide laterally to its longitudinal axis, said longitudinal holes extending in the direction in which the thigh support is moved in order to open and close the detent means.

7. Vehicle seat according to claim 6, characterized in that the longitudinal holes extend in the longitudinal direction of the seat and the thigh support can be moved from the rear section of the seat in the direction of the longitudinal holes against the force of a pre-biased return spring means, connected to the upholstery support body, for releasing the detent means.

8. Vehicle seat according to claim 1, characterized in that the thigh support includes a fillet as a graspable handle on its front bottom edge, said fillet extending in the lateral direction and being openly accessible from beneath.

9. Vehicle seat according to claim 1, characterized in that the thigh support includes a downwardly open groove running along its lower edge, in which groove a reinforcing strip engages and is secured along said lower edge.

10. Vehicle seat according to claim 1, characterized in that the thigh support has a height which decreases toward its rear end and the upholstery element mounted on the upholstery support body has a thickness which increases correspondingly toward the rear end of the thigh support.

11. Vehicle seat according to claim 1, characterized in that facing end surfaces of the thigh support and the rear section of the seat are inclined in the same direction and to the same degree, relative to a plane defined by the direction of movement of the upholstery support body.

12. Vehicle seat according to claim 11, characterized in that, even at the greatest possible distance of the thigh support from the rear section of the seat, the thigh support and the rear section have an overlapping portion.

13. Vehicle seat according to claim 12, characterized in that the upholstery element of the thigh support extends rearwardly beyond the upholstery support body.

14. Vehicle seat according to claim 1, characterized in that the upholstery support body and the upholstery element are both plastic bodies.

15. Vehicle seat according to claim 3, characterized in that both the adjacent guide bodies and the upholstery support bodies are formed as identical, one-piece elements made of plastic.

16. The vehicle seat according to claim 1, wherein said support device is made of a single piece of plastic and comprises adjacent guide bodies each supported by one of said bars.

17. The vehicle seat according to claim 16, wherein said upholstery support body is formed of a single piece of plastic and has the shape of a basin having a downwardly directed opening.

18. A vehicle seat, comprising:
    a seat section;
    two support bars rigidly extending from the seat section;
    a support device having two sleeves therein for mounting on the two support bars in a longitudinally adjustable manner, said support device including a rib with a plurality of notches therein;
    a hollow upholstery support body having an internal projection and being pivotably mounted on said support device so as to encase said support device, said projection being adapted to fit into said notches for locking the support body with respect to the seat section; and an upholstery element mounted on the upholstery support body;

whereby said upholstery support body forms a first thigh support which can be adjusted longitudinally and pivotally with respect to the seat section.

19. The vehicle seat according to claim 18, further comprising means for pivotally connecting the support device to the hollow upholstery support body.

20. The vehicle seat according to claim 19, further comprising a second thigh support in side by side relation to the first thigh support.

* * * * *